United States Patent [19]

Takahata, deceased

[11] 4,122,471
[45] Oct. 24, 1978

[54] AUTOMATIC STOP MOTION DEVICE IN A MOTOR DRIVE CAMERA

[75] Inventor: Kouichi Takahata, deceased, late of Tokyo, Japan, by Kosaku Takahata, father and legal successor

[73] Assignee: Nippon Kogaku K.K., Tokyo, Japan

[21] Appl. No.: 789,694

[22] Filed: Apr. 21, 1977

[30] Foreign Application Priority Data
Apr. 30, 1976 [JP] Japan .................. 51-48472

[51] Int. Cl.² ........................... G03B 1/18; H02P 5/36
[52] U.S. Cl. ................................. 354/173; 318/345 B
[58] Field of Search ............... 354/173; 352/169, 174, 352/175; 318/345 B, 345 F

[56] References Cited
U.S. PATENT DOCUMENTS
3,940,776 2/1976 Kondo ................... 354/173

Primary Examiner—Michael L. Gellner
Attorney, Agent, or Firm—Fitzpatrick, Cella, Harper & Scinto

[57] ABSTRACT

An automatic stop motion device in a motor drive camera includes a motor for effecting film winding, a power supply including a battery for supplying a current to the motor, a time measuring circuit for measuring the time during which the current is supplied to the motor and for putting out a signal corresponding to the time, and a detector for detecting when the output signal of the time measuring circuit has reached a predetermined value, thereby judging the state of impossibility of film winding and cutting off the supply of current to the motor.

8 Claims, 4 Drawing Figures

AUTOMATIC STOP MOTION DEVICE IN A MOTOR DRIVE CAMERA

BACKGROUND OF THE INVENTION

1. Field of the Invention

This invention relates to an automatic stop motion device in a motor drive camera which automatically cuts off the supply of current to a motor to stop film winding when photographic film is wound by an effective number of frames or when the film is caught to prevent film winding.

2. Description of the Prior Art

Heretofore, an automatic stop motion device for a motor is known which mechanically detects the slip of the motor caused by a friction mechanism when film winding is impossible, thereby cutting off the supply of current to the motor.

However, such conventional device which mechanically detects the slip of the motor has suffered from the following disadvantages:

(1) When the source voltage drops, the drive of the motor is reduced and the motor is stopped from running in spite of a current flowing thereto. This results in the heating of the motor or injuries imparted to the film; and (2) The mechanism for detecting the slip of the motor is complicated and requires a large space.

SUMMARY OF THE INVENTION

The present invention has, for its object, to provide an automatic stop motion device in a motor drive camera which cuts off the supply of current to the motor irrespective of the value of the source voltage whenever film winding is impossible.

According to the present invention, the automatic stop motion device comprises a motor for effecting film winding, current supply means for supplying a current to the motor, the current supply means including a power source, a time measuring circuit for measuring the time during which the current is supplied to the motor and for emitting signal corresponding to the time, and detector means for detecting when the output signal of the time measuring circuit has reached a predetermined value, thereby judging the state of impossibility of film winding and cutting off the supply of current to the motor.

The invention will become more fully apparent from the following detailed description thereof taken in conjunction with the accompanying drawings.

DESCRIPTION OF THE PREFERRED EMBODIMENTS

Figure 1:
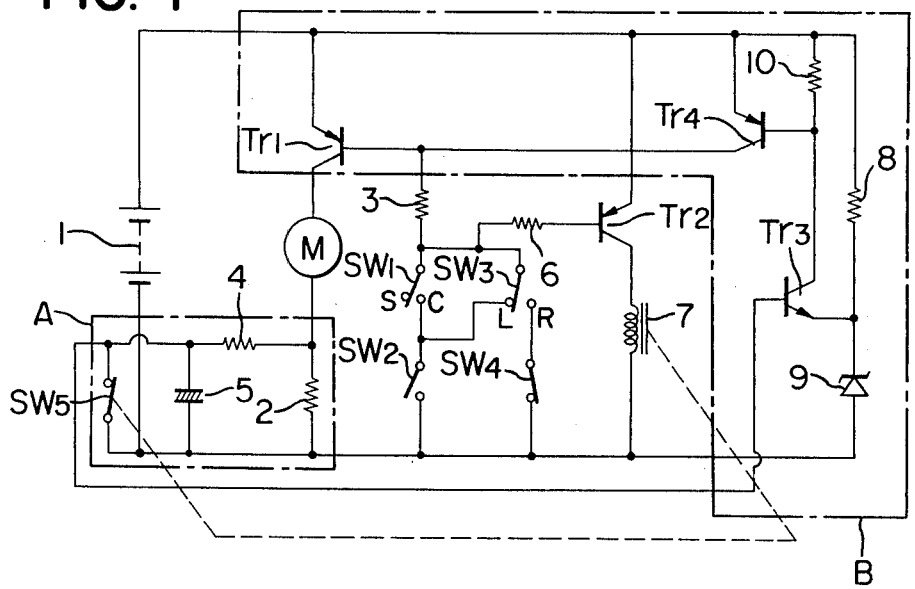
FIG. 1 is a circuit diagram of a first embodiment of the present invention and showing a position in which film winding has been completed.

Referring to FIG. 1, a circuit diagram of an embodiment of the present invention is shown in a position in which film winding has been completed.

In FIG. 1, one terminal of a motor M is connected to the negative terminal of a power source 1 through a resistor 2 for generating a voltage proportional to a current flowing to the motor M, and the other terminal of the motor is connected to the positive terminal of the power source 1 through a transistor Tr1. One end of a resistor 3 is connected to the base of the transistor Tr1. The other end of the resistor 3 is connectible to the negative terminal of the power source 1 through an SC switch SW1 and a photography completing switch SW2. The SC switch SW1 may be changed over for closing at its contact S during single-frame photography and for closing at its contact C during continuous photography. The photography completing switch SW2 is responsive to a signal from the camera side to be closed from the moment when the movement of the rearward shutter curtain has been completed till the completion of film winding, and remains open during the other time. One end of a release switch SW3 is connected to the junction between the resistor 3 and the SC switch SW1. The other end of the release switch SW3 is connectible to its contact R upon depression of unshown release button, and connectible to its contact L upon release of the release button. The contact L is provided at the junction between the terminal C of the SC switch SW1 and the photography completing switch SW2, and the contact R is connected to the negative terminal of the power source 1 through a phase switch SW4. This phase switch SW4 is operatively associated with an unshown film winding shaft so that it is closed upon or immediately before the completion of film winding and remains so closed until the forward shutter curtain begins to move. A resistor 4 and a capacitor 5 together constitute an integrating circuit. The capacitor 5 may be charged with the voltage across the resistor 2 in accordance with the time constant determined by the resistor 4 and capacitor 5.

Transistor Tr2 is connected in series with the power source 1 through a relay coil 7 and has its base connected to the junction between the release switch SW3 and the resistor 3 through a resistor 6. That is, the circuit comprising the transistor Tr2 and the relay coil 7 is connected so that current flows therethrough as long as there is a current flowing to the motor M.

A reset switch SW5 is provided which, when closed, may short-circuit the capacitor 5, and is opened as long a there is a current flowing through the relay coil 7. The resistors 2, 4, the capacitor 5 and the reset switch SW5 together constitute a charging circuit A.

A serial connection of resistor 8 and constant voltage diode 9 is further connected in series with the power source 1. A reference voltage may be generated at the junction between the resistor 8 and the constant voltage diode 9.

A transistor Tr3 is designed to conduct when the charging voltage of the capacitor 5 has exceeded the aforementioned reference voltage. A transistor Tr4 has its base connected to the junction between the collector of the transistor Tr3 and a resistor 10 and is designed to conduct upon turn-on of the transistor Tr3 and thereby turn off the transistor Tr1. The resistors 8, 10, the constant voltage diode 9 and the transistors Tr1, Tr3 and Tr4 together constitute detector means B.

Figure 2A:
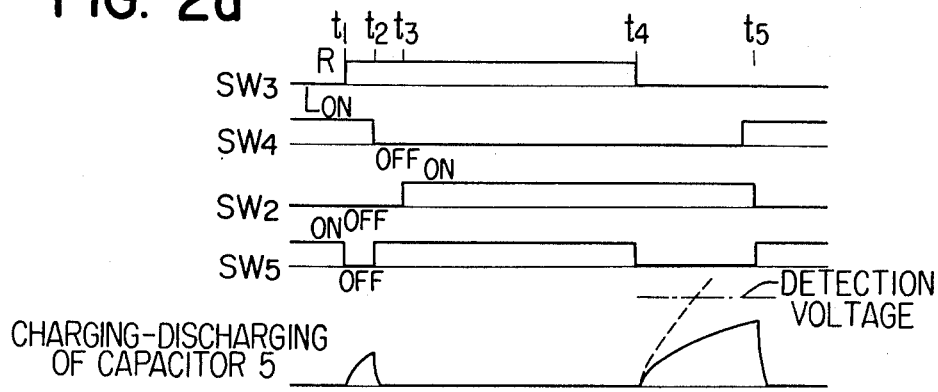
FIG. 2a is a time chart for illustrating the states of switches and charging voltage of capacitor during single-frame photography.
Figure 2B:
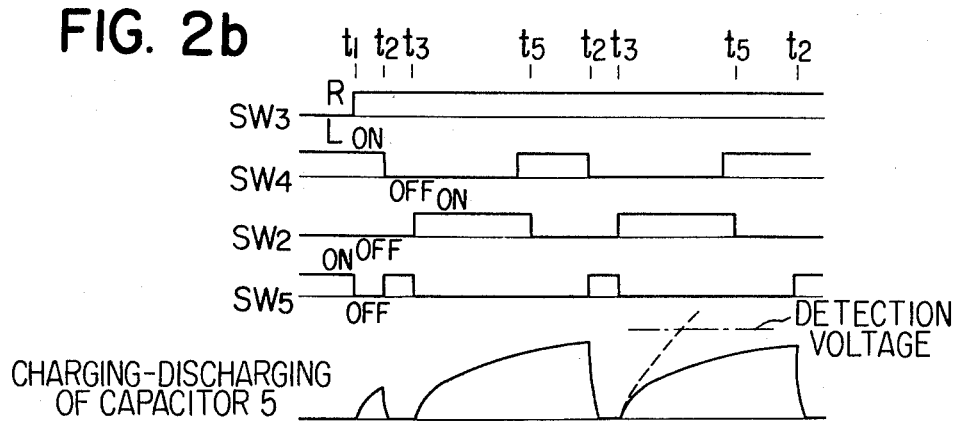
FIG. 2b is a time chart for illustrating the states of switches and charging voltage of capacitor during continuous photography.

FIGS. 2a and 2b are time charts for illustrating the states of the switches and charging voltage of the capacitor. FIG. 2a refers to the case of single-frame photography and FIG. 2b refers to the case of continuous photography.

Operation of the circuit will now be described in detail by reference to FIG. 1 and FIGS. 2a and 2b.

First, operation will be considered with respect to the case of single-frame photography, namely, the case where the SC switch SW1 is closed at its contact S.

(i) The state before the photographic film is wound by the effective number of frames:

Before the release button, not shown, is depressed, as shown in FIGS. 1 and 2a, the photography completing switch SW2 is in OFF position, the release switch SW3 is connected to the terminal L, the phase switch SW2 is in ON position, and the reset switch SW5 is in ON position.

When the release button, not shown, is depressed at a certain time $t_1$, the release switch SW3 is changed over into engagement at the contact R. Since the phase switch SW4 is then in ON position, the transistor Tr1 conducts and the motor M starts to run. The depression of the unshown release button also turns on the transistor Tr2 to permit a current to flow to the relay coil 7, so that the reset switch SW5 assumes OFF position. Thus, a voltage is generated across the resistor 2 by the current flowing to the motor M and the voltage across the capacitor 5 is increased by the voltage across the resistor 2.

In the circuit when in the above-described position as the result of the depression of the unshown release button, if the forward shutter curtain starts to move, the phase switch SW4 assumes OFF position. The time at which the forward shutter curtain starts to move is defined as $t_2$. When the switch SW4 assumes OFF position, the transistor Tr1 is turned off and the current supplied to the motor M becomes null, so that the motor M is stopped at once. On the other hand, the OFF position of the switch SW4 also turns off the transistor Tr2, whereby the reset switch SW5 assumes ON position to cause the capacitor 5 to discharge.

Subsequently, when the movement of the rearward shutter curtain is completed at a time $t_3$, the photography completing switch SW2 assumes ON position.

Thereafter, when the release button is released from its depressed condition at a time $t_4$, the release switch SW3 is changed over from the contact R to the contact L. As the result, the transistor Tr1 conducts to permit a supply of current to the motor M. By the energization of the motor M, film winding is effected. On the other hand, the change-over of the release switch SW3 from the contact R to the contact L also turns on the transistor Tr2 to permit a current to flow to the coil 7 and thereby bring the reset switch SW5 into OFF position. As the result, the capacitor 5 is charged with the voltage across the resistor 2 in accordance with the time constant determined by the values of the resistor 4 and capacitor 5.

Immediately before the winding is completed, the phase switch SW4 assumes ON position, and the photography completing switch SW2 assumes OFF position at a time $t_5$ whereat the film winding is completed. Thus, the transistor Tr2 is also turned off while the reset switch SW5 assumes ON position, thereby causing the capacitor 5 to discharge.

In this manner, the previously described state before the depression of the release button is restored.

(ii) The state in which the photographic film has been wound up by the effective number of frames:

Immediately after the prescribed number of film frames has all been exposed and the unshown release button has been released from depression and when film winding has become impossible, the unshown winding shaft is stopped from rotating.

In such state, however, the photography completing switch SW2 is in ON position and the release switch SW3 is closed at its contact L. Thus, the transistor Tr1 is in conductive state so that a great current flows to the motor M due to the great load of the wind shaft. Since the photography completing switch SW2 is in ON position and the release switch SW3 is closed at its contact L, the transistor Tr2 is also in conductive state and the reset switch SW5 is in OFF position. Therefore, the capacitor 5 is charged with the voltage across the resistor 2. That is, the charging voltage of the capacitor is varied as indicated by the broken line in FIG. 2a.

When the charging voltage of the capacitor 5 exceeds the reference voltage generated at the junction between the resistor 8 and the constant voltage diode 9, the transistor Tr3 conducts and as the result, the transistor Tr4 also conducts. By the turn-on of the transistor Tr4, the transistor Tr1 is turned off so that the current driving the motor M is cut off.

However, when the source voltage is low, the time required for the charging voltage of the capacitor 5 to exceed the reference voltage is longer than when the source voltage is high.

Operation during continuous photography, namely, when the SC switch SW1 is closed at its contact C, will now be described by reference to FIG. 1 and FIG. 2b.

(i) The state before the film is wound by the effective number of frames:

Before the rearward shutter curtain moves, operation is similar to that in case of the single-frame photography.

When the movement of the rearward shutter curtain is completed at a time $t_3$, the photography completing switch SW2 assumes ON position. Thereafter, if the release button is left in depressed position, the release switch SW3 remains connected to the contact R.

When the photography completing switch SW2 assumes ON position, the transistor Tr1 conducts so that the motor M starts to run.

At the same time, the reset switch SW5 assumes OFF position upon turn-on of the transistor Tr2.

Thus, film winding takes place while the capacitor 5 is charged.

Immediately before the completion of the film winding, the phase switch SW4 assumes ON position and at the time $t_5$ of completion of the film winding, the photography completing switch SW2 assumes OFF position.

However, as long as the unshown release button is depressed, the current continues to flow to the motor M in spite of the fact that the release switch SW3 remains closed at its contact R to stop the film wind shaft.

When the movement of the forward shutter curtain starts at the time $t_2$, the phase switch SW4 may assume OFF position.

Thus, the transistor Tr1 is turned off to cut off the supply of current to the motor M.

At the same time, the transistor Tr2 is turned off and the reset switch SW5 assumes ON position, so that the charge stored in the capacitor 5 from the time $t_3$ of completion of the movement of the rearward shutter curtain till the time $t_2$ of start of movement of the forward shutter curtain is discharged.

Thereafter, when the movement of the rearward shutter curtain is completed at the time $t_3$, the photography completing switch SW2 assumes ON position. Therefore, the transistor Tr1 conducts to permit a supply of current to the motor M, thereby effecting film winding.

At that time, charging of the capacitor 5 is taking place.

In this manner, continuous photography is effected as long as the release button is depressed.

(ii) The state in which the photographic film has been wound up by the effective number of frames:

In this case, film winding can no longer take place and the unshown wind shaft is stopped. However, the SC switch SW1 is closed at its contact C and the photography completing switch SW2 is in ON position, so that the transistor Tr1 is in conductive state. Consequently, the current is being supplied to the motor M, which thus tries to rotate the wind shaft. Thus, the motor M is supplied with a great current as in the case of single-frame photography. At the same time, the transistor Tr2 is in conductive state, so that the reset switch SW5 is in OFF position and the capacitor 5 is charged with the voltage across the resistor 2.

The subsequent operation of cutting off the current to the motor M is similar to what has been described with respect to the single-frame photography.

In the first embodiment now under discussion, the motor current is directly integrated to thereby effect detection of the charging and this leads to the effect that the greater the current flowing to the motor M, the earlier the supply of current to the motor M can be cut off.

A second embodiment will now be described.

Figure 3:
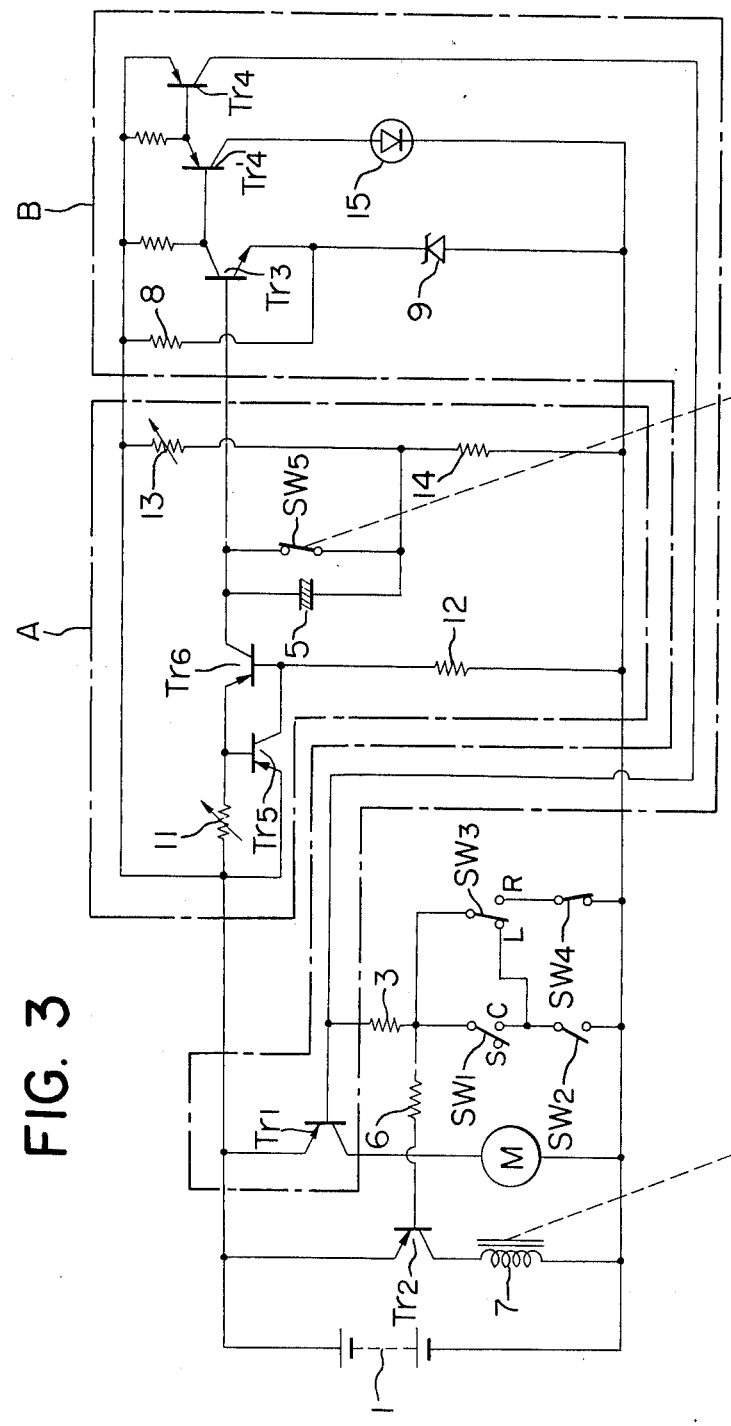
FIG. 3 is a circuit diagram showing a second embodiment of the present invention.

FIG. 3 is a circuit diagram showing the second embodiment of the present invention as it is in a position where film winding has been completed.

In the above-described first embodiment, when the motor M is not energized, the capacitor is charged with the voltage across the resistor 2 connected in series with the motor M and the quantity of charge is compared with the reference voltage, whereas the second embodiment differs from the first embodiment in that the capacitor 5 is charged with the output current from a constant current circuit comprising resistors 11, 12 and transistors Tr5, Tr6 and the voltage across the charged capacitor 5 is added to the voltage from the junction in a voltage dividing circuit 13, 14 which is proportional to the source voltage, and the sum of these voltages is compared with the reference voltage.

In FIG. 3, elements functionally similar to those in FIG. 1 are given similar reference characters and need not be described.

In FIG. 3, transistors Tr5, Tr6, a variable resistor 11 and a fixed resistor 12 together constitute a known constant current circuit for supplying a constant current independently of the source voltage. A variable resistor 13 and a fixed resistor 14 together constitute a voltage dividing circuit for generating a voltage which is dependent of the source voltage. A capacitor 5 has one end connected to the collector of the transistor Tr6 which is the output terminal of the constant current circuit, and the other end connected to the junction between the resistors 13 and 14 forming the voltage divider.

The reset switch SW5 serves to control the charging-discharging of the capacitor 5, as in the first embodiment. The capacitor 5, resistors 11, 12, 13, 14, transistors Tr5, Tr6 and reset switch SW5 together constitute a charging circuit.

A resistor 8 and a constant voltage diode 9 together constitute a reference voltage generating circuit for supplying a constant voltage to the emitter of a transistor Tr3.

If the sum of the voltage at the junction between the resistors 13 and 14 and the charging voltage of the capacitor 5 exceeds the emitter voltage of the transistor Tr3, this transistor Tr3 will conduct. When the transistor Tr3 conducts, transistors Tr4' and Tr4 conduct. As the result of the turn-on of the transistor Tr4, the transistor Tr1 is turned off. By the turn-on of the transistor Tr4', a light emitting diode 15 is turned on. The transistors Tr1, Tr4', Tr4 and the light emitting diode 15 together constitute a control circuit. The reference voltage generating circuit and the control circuit together constitute detector means B.

Operation of the second embodiment is entirely similar to that of the first embodiment with the exception that the constant current circuit and the voltage dividing circuit are provided in the charging circuit as already described, and need not be described further.

In this embodiment, detection of the charging of the capacitor 5 is effected in dependence of the voltage of the power source 1, instead of the current flowing to the motor M, so that however much current flows to the motor M, the supply of current to the motor M can not be stopped until after a predetermined time has passed from the start of charging.

In the second embodiment wherein the capacitor 5 is charged with a constant current, the relation between the charging voltage and the charging time becomes a linear function. If, as shown in FIG. 3, the resistor 11, is variable, the gradient of the linear function can be varied, and if the resistor 13 is variable, the linear function can be parallel-moved. In other words, by making the resistor 13 variable, it is possible to vary the charging voltage during the zero time while maintaining the gradient of the linear function and this is very convenient in controlling the detection voltage and the detection time.

Also, by causing the voltage dividing circuit 13, 14 to apply to one end of the capacitor 5 which is dependent of the source voltage, the time required for the quantity of charge stored in the capacitor 5 to reach a predetermined value can be automatically varied dependent upon the variation in the source voltage. In other words, if the time required to transport the film is increased by a drop of the source voltage, the detection time can be automatically elongated in accordance with the variation in the source voltage.

In each of the first and second embodiments, if an indication circuit comprising a light emitting diode 15 or the like is connected in series with the transistor Tr4, as shown in FIG. 3, so as to effect light emission and indication whenever the motor M is not energized, a convenience will be provided for the photographer to know the deenergization of the motor from the light emitted from the light emitting diode 15.

There have heretofore been cameras in which a taken-up spool is function-coupled to a wind shaft rotatable only in the normal direction so that rewind can be effected when a rewind member such as a rewind button or the like for freeing the sprocket is operated. In such a camera, if arrangement is made such that the reset switch SW5 is closed in response to the rewind member to release the charging circuit, whereby the motor is operated to ensure the wind shaft in the camera body to be stopped at a predetermined position, then coupling of the motor drive body to the wind shaft will be easy and convenient to do during the attachment of the motor drive body to the camera body.

According to the present invention, as has hitherto been described in detail, during the time when current is being supplied to the motor, such time is measured and, when a predetermined time has passed, the supply of current to the motor is cut off by the time detection signal and therefore, when film winding is impossible in spite of the current being supplied to the motor, the motor can be automatically stopped without fail even if the source voltage has dropped. As the result, wasteful consumption of the battery or damages to the motor and film may be eliminated. Also, the mechanism therefor is electrically constructed and this means simplicity and compactness of the mechanism.

Further, according to the present invention, the motor can be stopped without fail irrespective of any drop of the source voltage, so that the battery can be effectively utilized until the motor can no longer generate the necessary torque to wind the film.

What is claimed is:

1. An automatic stop motion device in a motor drive camera comprising:
    (a) a motor for effecting film winding;
    (b) current supply means for supplying a current to said motor, said current supply means including a power supply;
    (c) a charging circuit which is charged by a voltage corresponding to the current running through said motor during the supply of the current to said motor; and
    (d) detector means for detecting when the charging voltage of said charging circuit has reached a predetermined value, thereby determining the condition of impossibility of film winding and cutting off the supply of current to said motor.

2. An automatic stop motion device as defined in claim 1, wherein said charging circuit includes:
    voltage generating means for generating a voltage proportional to the current flowing to said motor; and
    integrating means for generating a voltage integrated with the voltage produced by said voltage generating means, the voltage which said integrating means generates being charging voltage of said charging circuit.

3. An automatic stop motion device as defined in claim 2, wherein said detector means includes:
    constant voltage generating means for generating a constant voltage;
    comparator means for receiving as input the voltage generated by said integrating circuit and the voltage generated by said constant voltage generating means and for comparing said two voltages, said comparator means generating a signal when the voltage generated by said integrating circuit exceeds the constant voltage generated by said constant voltage generating means; and
    a control circuit for receiving as input said signal generated by said comparator means to break the connection between said motor and said power supply.

4. An automatic stop motion device as defined in claim 2, wherein said integrating means includes:
    a capacitor, the capacitor generating thereacross a voltage provided by integrating a voltage which said voltage generating means generates; and
    a discharging circuit, said discharging circuit discharging an electric charge stored across said capacitor when no supply of current to said motor is effected, except when the supply of current to the motor is stopped by a signal from said detector means.

5. An automatic stop motion device in a motor drive camera comprising:
    (a) a motor for effecting film winding;
    (b) current supply means for supplying a current to said motor, said current supply means including a power source;
    (c) constant current means for providing a constant current whenever current is supplied to said motor;
    (d) a voltage dividing circuit for generating a voltage dependent upon the power source;
    (e) a capacitor for receiving as input the output current from said constant current means thereby to generate a voltage proportional to time; and
    (f) detector means for detecting when the sum of the voltage generated by said capacitor and said voltage dividing circuit has reached a predetermined value, thereby determining the condition of impossibility of film winding and cutting off the supply of current to said motor.

6. An automatic stop motor device as defined in claim 5, wherein said constant current means includes a variable resistor, the changing of the value of said variable resistor causing the constant current which said constant current means provides to be arbitrarily set, whereby the time period until the sum of the voltage generated by said capacitor and said voltage dividing circuit reaches a predetermined value can be adjusted.

7. An automatic stop motion device as defined in claim 6, wherein said voltage dividing circuit includes two resistors connected in series to each other, the two resistors being connected in series to said power source and the resistance value of at least one of said two resistors being variable so that adjusting of the variable resistor causes the value of the voltage generated at the function of the two resistors to be arbitrarily set.

8. An automatic stop motion device as defined in claim 5, wherein said detector means includes an indicator element, said indicator element changing its state when the sum of the voltage generated by said capacitor and said voltage dividing circuit reaches a predetermined value thereby to indicate the condition of impossibility of film winding.

* * * * *